US011764713B2

(12) United States Patent
Goodman et al.

(10) Patent No.: US 11,764,713 B2
(45) Date of Patent: Sep. 19, 2023

(54) CONTROL SYSTEM AND MOVABLE FOLDING PARTITION

(71) Applicant: Won-Door Corporation, Salt Lake City, UT (US)

(72) Inventors: E. Carl Goodman, Salt Lake City, UT (US); Duane O. Hall, Sandy, UT (US); Nathan Godwin, Orem, UT (US); Daniel L. Steadman, Springville, UT (US)

(73) Assignee: Won-Door Corporation, Salt Lake City, UT (US)

( * ) Notice: Subject to any disclaimer, the term of this patent is extended or adjusted under 35 U.S.C. 154(b) by 657 days.

(21) Appl. No.: 15/813,654

(22) Filed: Nov. 15, 2017

(65) Prior Publication Data

US 2018/0175760 A1    Jun. 21, 2018

Related U.S. Application Data

(60) Provisional application No. 62/434,415, filed on Dec. 15, 2016.

(51) Int. Cl.
| | |
|---|---|
| *H02P 6/16* | (2016.01) |
| *H02P 7/06* | (2006.01) |
| *H02P 7/29* | (2016.01) |
| *E05F 15/632* | (2015.01) |
| *E05B 17/22* | (2006.01) |
| *E05F 15/48* | (2015.01) |
| *E06B 3/92* | (2006.01) |
| *E05F 15/70* | (2015.01) |
| *E05D 15/06* | (2006.01) |

(Continued)

(52) U.S. Cl.
CPC ............ *H02P 7/2913* (2013.01); *E05B 17/22* (2013.01); *E05D 15/0652* (2013.01); *E05F 15/48* (2015.01); *E05F 15/605* (2015.01); *E05F 15/632* (2015.01); *E05F 15/70* (2015.01); *E05F 15/77* (2015.01); *E06B 3/92* (2013.01); *E05B 2047/0048* (2013.01); *E05B 2047/0094* (2013.01); *E05Y 2201/22* (2013.01); *E05Y 2201/42* (2013.01); *E05Y 2800/73* (2013.01); *E05Y 2900/142* (2013.01)

(58) Field of Classification Search
CPC ............................ H02J 7/0042; H02H 39/006
See application file for complete search history.

(56) References Cited

U.S. PATENT DOCUMENTS

| | | |
|---|---|---|
| 5,479,151 A | 12/1995 | Lavelle et al. |
| 5,552,766 A | 9/1996 | Lee et al. |

(Continued)

FOREIGN PATENT DOCUMENTS

CA         2749210 A1    7/2009

*Primary Examiner* — Kawing Chan
*Assistant Examiner* — Charles S Laughlin
(74) *Attorney, Agent, or Firm* — TraskBritt

(57) ABSTRACT

Various embodiments of the present disclosure relate, generally, to a control system for a movable partition. In one embodiment, the control system is an access control system that includes a lock control interface and a remote line interface at which lock modes are asserted, and which are communicated to a door controller. Protocols installed at the controller enable the controller to provide control signals to the movable partition responsive to the various lock modes asserted at the lock control interface and remote line interface.

23 Claims, 14 Drawing Sheets

(51) Int. Cl.
    *E05F 15/605*     (2015.01)
    *E05F 15/77*     (2015.01)
    *E05B 47/00*     (2006.01)

(56) References Cited

U.S. PATENT DOCUMENTS

| | | |
|---|---|---|
| 5,831,403 A | 11/1998 | Kanki et al. |
| 6,422,463 B1 | 7/2002 | Flink |
| 6,662,848 B2 | 12/2003 | Goodman et al. |
| 7,190,132 B2 | 3/2007 | Goodman et al. |
| 7,391,319 B1 | 6/2008 | Walker |
| 7,734,572 B2 | 6/2010 | Wiemeyer et al. |
| 8,115,427 B2 | 2/2012 | Banta et al. |
| 8,376,020 B2 | 2/2013 | Smart |
| 8,471,676 B1 | 6/2013 | Lizaso |
| 8,692,493 B2 | 4/2014 | Hall et al. |
| 9,151,103 B2 | 10/2015 | Hall et al. |
| 2003/0202310 A1* | 10/2003 | Field .................. H02H 9/026 361/106 |
| 2004/0094275 A1* | 5/2004 | Goodman ............ E05D 15/26 160/188 |
| 2011/0093095 A1* | 4/2011 | Goodman ............ E05F 15/70 700/13 |
| 2013/0008618 A1* | 1/2013 | Hall ..................... E04B 2/74 318/400.29 |

\* cited by examiner

CONTROL SYSTEM AND MOVABLE FOLDING PARTITION

CROSS-REFERENCE TO RELATED APPLICATION(S)

This application claims the benefit under 35 U.S.C. § 119(e) of U.S. Provisional Patent Application Ser. No. 62/434,415, filed Dec. 15, 2016 the entire disclosure and contents of which is hereby incorporated by this reference.

TECHNICAL FIELD

Embodiments of the present disclosure relate generally to an interface circuit in a control system, and more specifically, to an interface circuit in a control system that controls a motor operated, movable, folding partition, and processes for accomplishing the same.

BACKGROUND

Conventional movable partitions may be assembled from several foldable or collapsible panels, hingedly connected to each other. The assembled partitions may be arranged to enclose or subdivide a room or other area. They may also be arranged to restrict access to an area, for example, providing a barrier in front of a store or office, or to protect an area, for example, from a fire.

Movable partitions have advantages over conventional swinging doors that include a door frame and lock (e.g., an electromagnetic lock or an electrified strike). Such door frames may limit the access through a space to just the area of the swinging door and affect the aesthetics of a space. The hinged connection of the panels enables a movable partition to fold and collapse into a compact unit for purposes of storage (e.g., in a pocket of a wall) when not deployed, maintaining an open look.

A conventional movable partition may include a motor and brake system, whereby, a partition hangs from a track and a motor-powered chain that extends and retracts the partition (or the door pulls itself along the track). A brake, motor control, or combination thereof may be used to slow down or hold the movable partition in a certain position. The motor controller may be coupled to hardware that, when activated, generates a request to open or close a movable partition. The motor controller may also be coupled to other systems, such as fire protection systems, that generate requests to open or close a movable partition. The motor controller may be configured to automatically control a motor to extend or retract a movable partition responsive to requests from, e.g., hardware or a fire protection system.

BRIEF SUMMARY

One or more embodiments of the present disclosure relate to an access control system operably coupled to a movable partition. The movable partition may have a motor and brake system that is operable to extend and retract the movable partition responsive to one or more control signals received from motor control circuitry. The system may include a remote interface and a lock control interface. The remote interface may include at least one remote input configured to be activated by an access device, and at least one output. The remote interface may be configured to activate the at least one output responsive to the activated at least one remote input. The lock control interface may include at least one monitored input configured to be coupled to the at least one output of the remote interface. The lock control interface may be configured to determine at least one lock condition responsive to the voltage value received at the at least one monitored input; and communicate the at least one lock condition to a door controller. The door controller may be configured to provide one or more control signals to the motor control circuitry responsive to the communicated at least one lock condition.

Other embodiments of the present disclosure include a system. The system may include a movable partition, an interface, and a door controller. The movable partition may have a motor and brake system that is operable to extend and retract the movable partition responsive to one or more control signals received from motor control circuitry. The interface may include a monitored circuit between a first activatable input and a second activatable input. The interface may be configured to disable or enable one or more activatable inputs responsive to activation of the first activatable input. The door controller may be communicatively coupled to the interface and operatively coupled to the motor control circuitry. The door controller may be configured to receive at least one input condition associated with the first activatable input from the interface system, and to disable or enable one or more ingress and egress inputs responsive to the received at least one input condition.

Other embodiments of the disclosure comprise methods of operating a movable partition, the movable partition having a motor and brake system that is operable to extend and retract the movable partition. The method may comprise receiving at a monitored input an indication of a lock mode being asserted at remote input. The lock mode may be indicative of modifying operation of the movable partition. The monitored input and remote input may be coupled by a monitored line. The method may also comprise modifying operation of the movable partition responsive to the lock mode being asserted by performing one or more first operations adapted to prevent a normal response to at least one of an ingress indicator or an egress indicator while the lock mode is being asserted.

The foregoing and other features and advantages of the embodiments will be more apparent from the descriptions, drawings and claims that follow.

BRIEF DESCRIPTION OF DRAWINGS

The purpose and advantages of the disclosed embodiments will be apparent to those of skill in the art from the summary in conjunction with the accompanying drawings, wherein.

DETAILED DESCRIPTION

Figure 1:
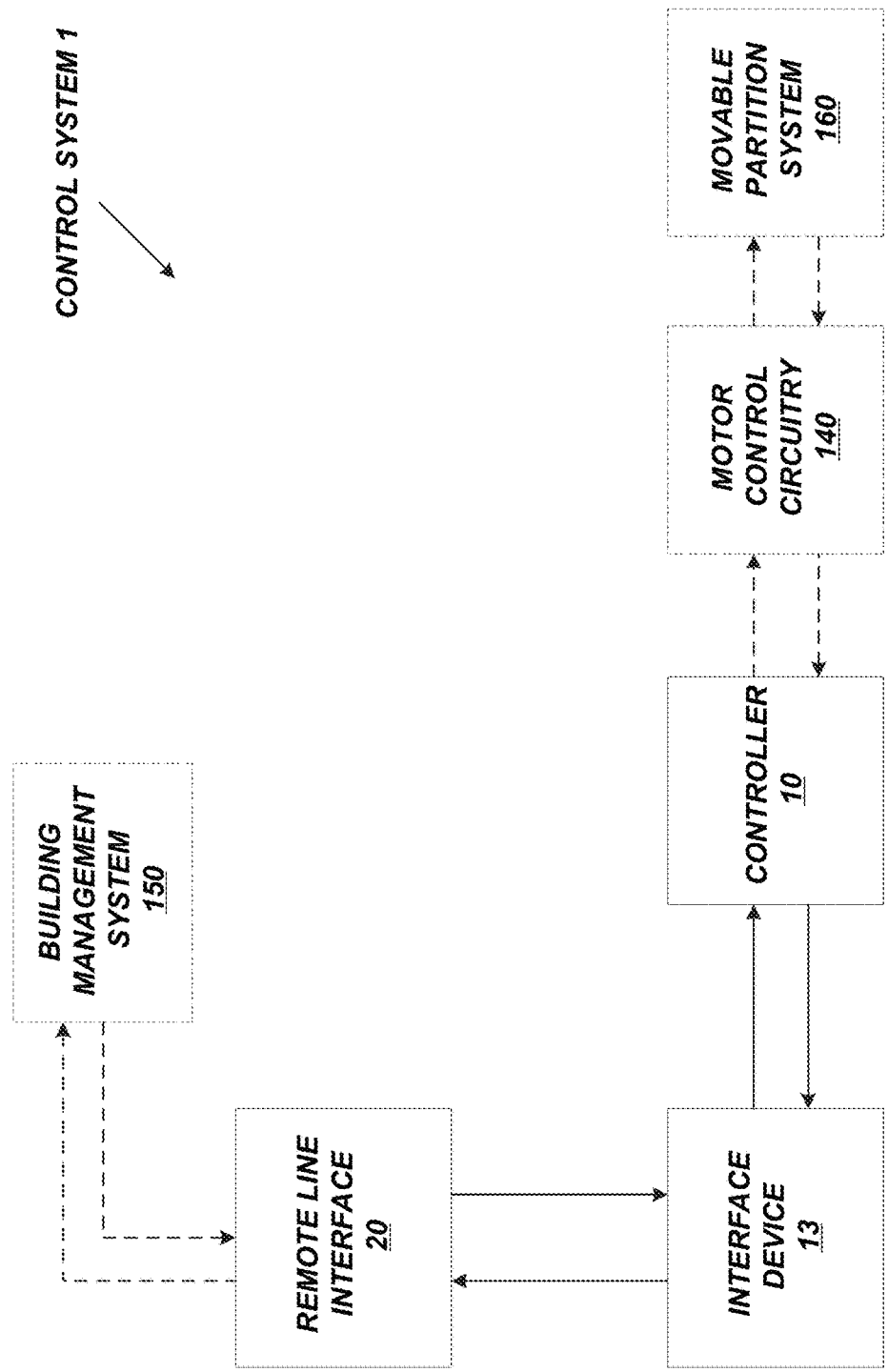
FIG. 1 illustrates a block diagram of a control system according to an embodiment of the disclosure.

The illustrations presented herein are, in some instances, not actual views of any specific foldable partition or control system, but are merely idealized representations that are employed to describe the present invention. Additionally, elements common between figures may retain the same numerical designation.

As used herein, both "door" and "movable partition" refer to a movable foldable partition with a motor and brake. Further, for simplicity various inputs may be described as "active" and "inactive." Generally, an input is considered "active" if an electrical signal, such as a voltage, has been applied to the input line that meets a design threshold. Similarly, an input is considered "inactive" if such electrical signal is not applied to the input or does not meet the design threshold. In some embodiments, the inputs and outputs described herein are I/O pins of a microcontroller.

In the following detailed description, circuits and functions may be shown in block diagram form in order not to obscure the present invention in unnecessary detail. Additionally, block definitions and partitioning of logic between various blocks as depicted is non-limiting, and may comprise examples of only specific embodiments. It will be readily apparent to one of ordinary skill in the art that the present invention may be practiced in a variety of embodiments implementing numerous other partitioning solutions.

Also, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process is terminated when its acts are completed. A process may correspond to a method, a function, a procedure, a subroutine, a subprogram, etc. Furthermore, the methods disclosed herein may be implemented in hardware, software, or both.

In the following description, certain terminology is used to describe certain features of one or more embodiments of the disclosure. For instance, the term "bus" refers to a plurality of signals or conductors, which may be used to transfer one or more various types of information, such as data, addresses, control, or status. Additionally, a bus or a collection of signals may be referred to in the singular as a signal. Some drawings may illustrate signals as a single signal for clarity of presentation and description. It will be understood by one of ordinary skill in the art that the signal may represent a bus of signals, wherein the bus may have a variety of bit widths and the present invention may be implemented on any number of data signals including a single data signal.

In various embodiments, a door controller is coupled to an interface which is coupled to a remote interface. The remote interface is coupled to the interface by a supervised line. Both the interface and the remote interface include inputs configured to be coupled to various control devices, and to receive an indicator that a control device has been asserted. Input conditions are generated at the interface responsive to the input that received the indication, and those input conditions are generally associated with specific control states/protocols stored in memory at the interface as well as at the door controller. Certain states/protocols may be associated with input conditions for inputs on the remote interface, which can be physically separated from the interface, door controller, and door for security, hazard protection, or other reasons.

FIG. 1 illustrates a control system 1 in accordance with at least one embodiment of the present disclosure. The control system 1 may include a controller 10, a remote interface 20, and an interface 13. The control system 1 may be electrically coupled to a motor control circuitry 140 for a movable partition 160 that includes a motor and brake. The control system 1 may also be coupled to a building management system 150, e.g., a computer-based control system installed in a building that controls and monitors the building's mechanical and electrical equipment such as ventilation, lighting, power systems, fire systems, and/or security systems.

In one or more embodiments, the motor control circuitry 140 may comprise a motor control arrangement in an H-bridge configuration to control the rotational direction of a motor, such as either of the arrangements described in U.S. Pat. No. 7,190,132, entitled "METHOD AND APPARATUS FOR MOTOR CONTROL USING RELAYS," issued on Mar. 13, 2007, and U.S. Pat. No. 8,115,427, entitled "METHODS, SYSTEMS, AND DEVICES FOR A MOTOR CONTROL SYSTEM," issued Feb. 14, 2012, the entire contents and disclosures of both of which are incorporated herein by this reference.

In one or more of the embodiments, pulse-width-modulation of control signals may be utilized by the motor control circuitry 140 to control the speed of the motor of the movable partition 160, for example, as described in U.S. Pat. No. 9,151,103, entitled, "METHODS FOR SPEED CONTROL OF A MOVABLE PARTITION," issued Oct. 6, 2015, and U.S. Pat. No. 8,692,493, entitled "METHODS, APPARATUSES, AND SYSTEMS FOR SPEED CONTROL OF A MOVABLE PARTITION," issued Apr. 8, 2014, the entire contents and disclosure of both of which are incorporated herein by reference.

In one or more embodiments, the movable partition 160 may be a foldable partition such as described in U.S. Pat. No. 6,662,848, entitled "AUTOMATIC DOOR AND METHOD OF OPERATING SAME," issued on Dec. 16, 2003, and U.S. Pat. No. 8,376,020, entitled "FOLDING PARTITIONS AND PARTITION SYSTEMS HAVING ADJOINING PANELS AND RELATED METHODS,"

issued on Feb. 19, 2013, the entire contents and disclosure of both of which are hereby incorporated by reference.

Figure 2:
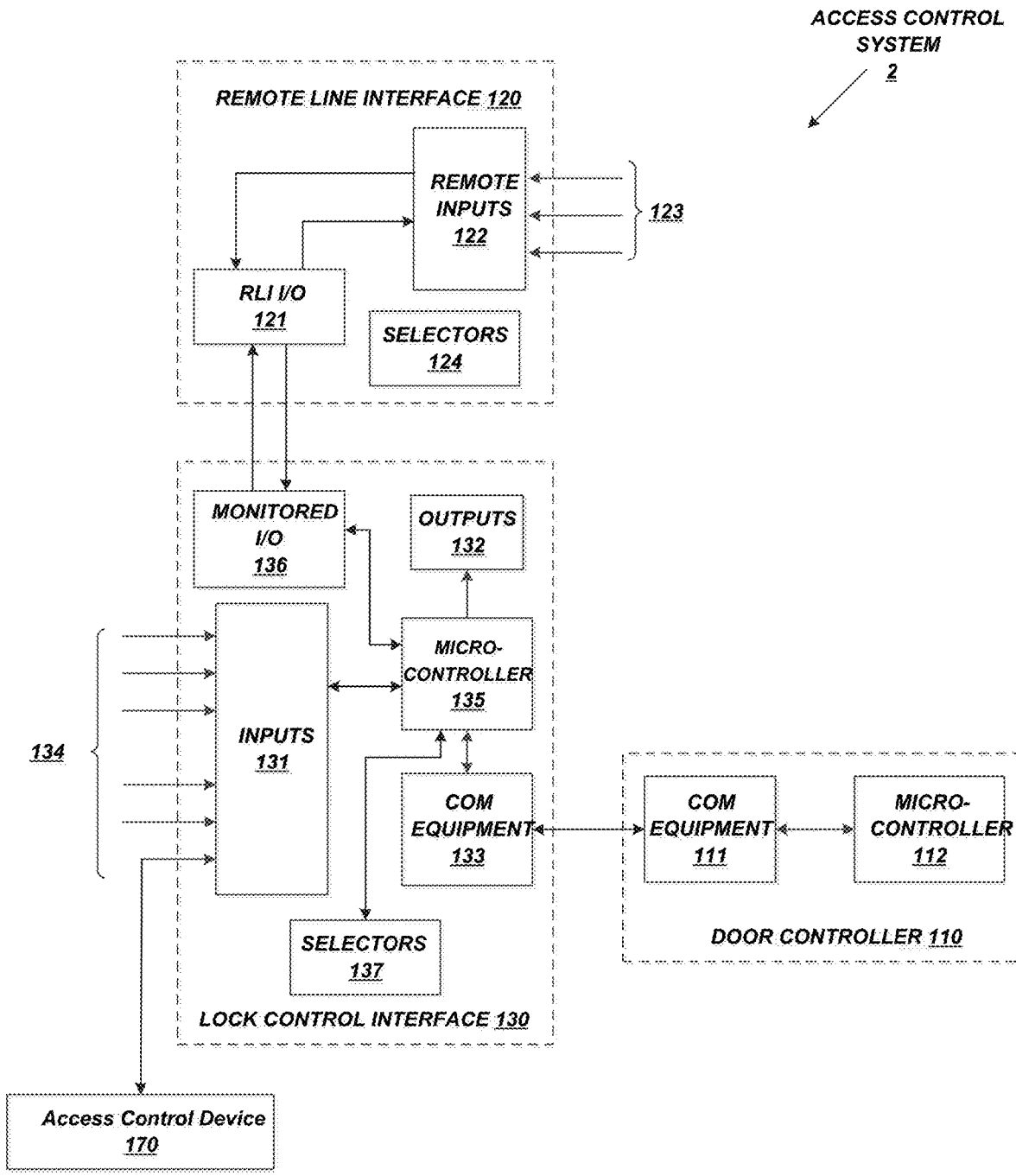
FIG. 2 illustrates a block diagram of an access control system that may be implemented to control a movable partition according to an embodiment of the disclosure.

FIG. 2 shows an access control system 2, in accordance with an embodiment of the disclosure. The access control system 2 may include a door controller 110, a lock control interface 130, and a remote line interface (RLI) 120. The door controller 110 may include a microcontroller 112 and communication (COM) equipment 111. The microcontroller 112 may be a general-purpose microcontroller, a field programmable gate array (FPGA) or other programmable logic component.

The door controller 110 may be communicatively coupled to the lock control interface 130 by way of COM equipment 111 and COM equipment 133. In one embodiment, the COM equipment 111 and COM equipment 133 may be bus jacks and lock control interface 130 may be coupled to the door controller 110 via an electrical bus line between the bus jacks.

Though not shown, the door controller 110 may include other sockets or communication equipment to communicate with external devices, for example, to communicate with alarms, building management systems, exit and entry hardware, control panels, card readers, key operated switches, pressure plates, biometric readers and devices, and combinations thereof.

The lock control interface 130 may include hardware inputs 131, outputs 132, COM equipment 133, microcontroller 135, monitored I/O 136 and selectors 137. The hardware inputs 131 may include one or more input lines 134. Various embodiments of the lock control interface 130 are configured to communicate, by way of the COM equipment 133, information to the door controller 110 indicative of a state of the one or more input lines 134 as active or inactive. The lock control interface 130 may transmit information about selected input lines via the COM equipment 111 and 133 to the door controller 110.

While the door controller 110 is coupled to the lock control interface 130, the parameters and operational protocols at the door controller 110 may execute responsive to the activated inputs 131. The protocols may be associated with one or more modes of operation of movable partition 160, and may be initiated responsive to the selected inputs 131.

The selectors 137 may be jumpers or switches that set the input conditions (e.g., normally open or normally closed) for one or more control devices electrically coupled to the hardware inputs 131. In various embodiments of the disclosure, the input lines 134 may be electrically coupled to one or more external signals (e.g., access control devices) or local signals (e.g., by a jumper to a voltage source line). Non-limiting examples of external signal sources include alarm relays, building management systems, access devices, and integrity circuits.

The lock control interface 130 may be coupled to the remote line interface 120 by a wired connection between the monitored I/O 136 and the RLI I/O 121. In one embodiment, standard 12-18 American wire gauge (AWG) is used for the wired connection and the remote line interface 120 may be up to about 10,000 feet from the lock control interface 130. The monitored I/O 136 may be configured to enable the lock control interface 130 to supervise the wired connection to the remote line interface 120, for open, short, and short-to-ground conditions (i.e., a "fault"), and provide alarm conditions to the door controller 110 in the event that a fault is detected. In one embodiment, the monitored I/O 136 may include a resistive divider circuit, and depending on the type of fault (e.g., open, short, short-to-ground) a different voltage is measured at the monitored I/O 136. The microcontroller 135 may be configured to provide a voltage value and/or an alarm condition to the door controller 110 responsive to the measured voltage.

The remote line interface 120 may include RLI I/O 121, remote inputs 122, and selectors 124. Various remote input lines 123 coupled to the remote inputs 122 may be dry contacts that close when an input is to be activated, or may be voltages from a monitored line. That is, the remote input lines 123 may be monitored lines (e.g., as part of a building management system, fire hazard protection system, security system, etc.), in which case a voltage is provided at the remote inputs 122. Selectors 124 may be used to switch between dry contacts or a voltage range, for example, 12-24 volts that the RLI will respond to. In the voltage range configuration, a control device supplying the current monitors the circuit, for example, with an end-of-line resistor.

Figure 3:
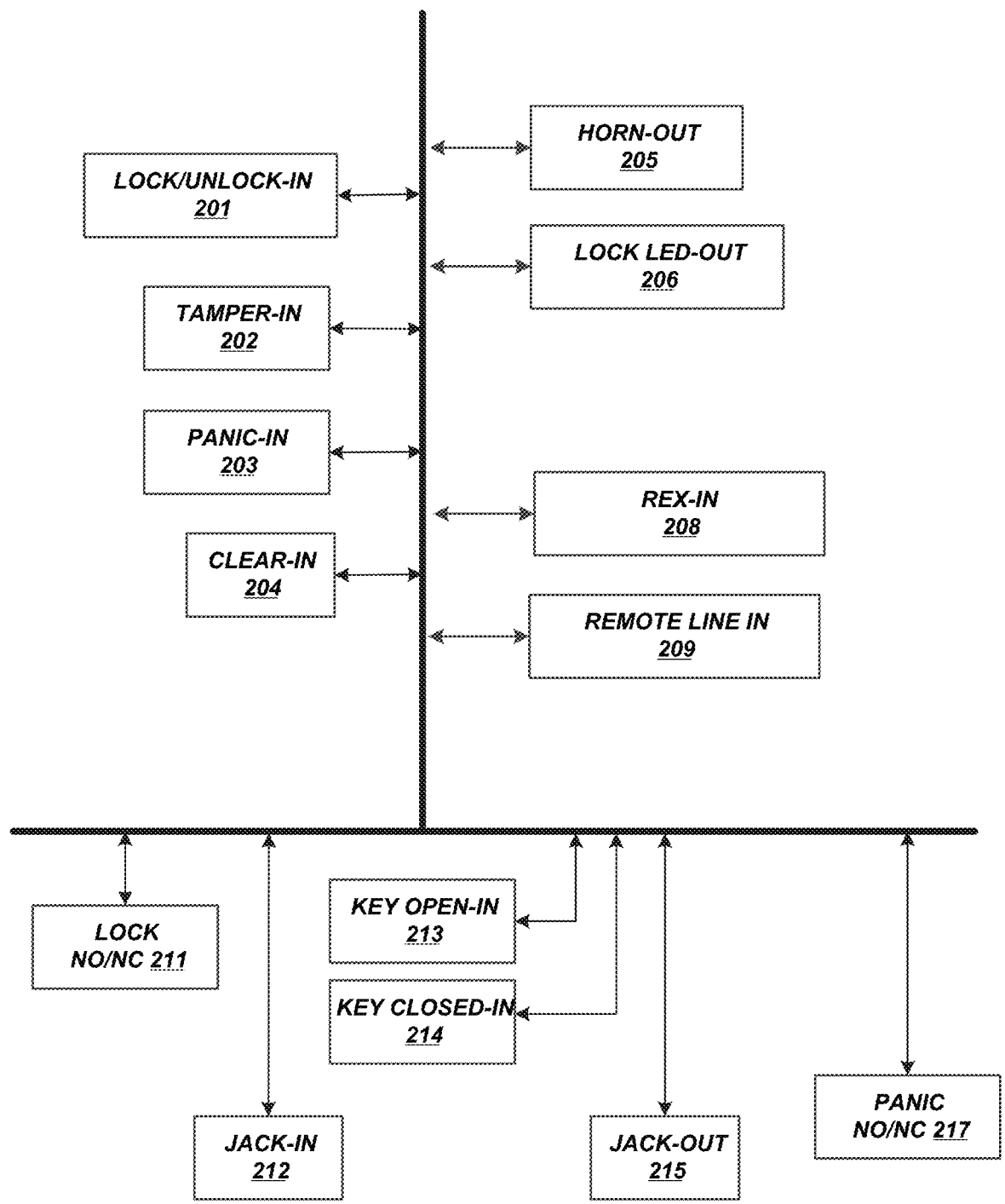
FIG. 3 illustrates a diagram of the inputs and outputs of a lock control interface implementable by an access control system according to an embodiment of the disclosure.

FIG. 3 shows inputs and outputs of the lock control interface 130, in accordance with an embodiment of an access control system 2.

Lock/Unlock-In 201 may be a wired input coupled to a dry contact at an end-user control device. Asserting the control device may activate the input. The lock control interface 130 may be configured to generate a lock or unlock condition responsive to the Lock/Unlock-In 201 being activated. The dry contact may be a normally open (NO) or a normally closed (NC) dry contact. The lock NO/NC 211 selector may be a switch or set of jumper pins, the setting of which determines if the Lock/Unlock-In 201 will generate a lock or unlock condition responsive to a NO or a NC dry contact condition.

The Tamper-In 202 may be a wired input coupled to a NO contact embedded in a control device. A changing condition (i.e., activated to not activated) in the wired input indicates that the control device has been tampered with, e.g., a face plate has been lifted off a patron key switch. If the embedded contacts in the control device are a NO contact, the contacts are held closed while the control device is in a safe state that is, fully assembled. While the contacts are held closed, the Tamper-In 202 is not activated. If the control device is tampered with (e.g., the face plate is removed) and the contact opens then the Tamper-In 202 is activated. Responsive to an activated Tamper-In 202, the microcontroller 135 (FIG. 2) may disable one or more of the input lines, and render the door in-operable by those inputs. In one embodiment, the Horn-Out 205 (e.g., a horn or flashing light) is activated to warn of a security breach. The inputs 201-216 may remain inoperable until the contact embedded in the control device is closed, a timer has passed, and/or a clear input is received.

The REX-In 208 may be a wired input coupled to a NO dry contact of a control device, where the contact closes when a qualified input is received. Examples of control devices that may provide the qualified input include a key switch, a card reader, an alpha-numeric key pad, a biometric reader, a motion sensor, or a building management system. While the REX-In 208 is activated, it generates a condition responsive to which the door controller 110 may control the brief (5-10 seconds) opening and closing of a door.

The Remote Line-In 209 is a monitored, wired input that is configured to be coupled to the remote line interface 120. The microcontroller 135 may be configured to identify a remote input 122 at the remote line interface 120 that generated an input signal. In one embodiment, the microcontroller 135 may be programmed to identify an input condition responsive to a voltage value determined from a measured voltage received at the Remote Line-In 209 and a look-up table stored in program memory (not shown), and may provide the input condition to the door controller 110. In various embodiments, the look-up table may be an array of valid inputs associated with specific input conditions.

The Panic-In 203 may be a wired input coupled to an isolated-dry-contact of a control device. Lock control interface 130 may be configured to respond to a NO or a NC closed contact coupled to the Panic-In 203. In various embodiments, a Panic NO/NC 217 selector may be a switch or set of jumper pins, the setting of which determines whether the Panic-In 203 responds to a NO or a NC contact. If the control device is asserted and the Panic-In 203 is activated, an input condition is generated responsive to which the lock control interface 130 will enter a "panic" state, and send a panic and lock condition to the door controller 110 to lock the door. In one embodiment, while the lock control interface 130 is in a "panic" state, the microcontroller 135 may be programmed to disable inputs other than the REX-IN 208 and a Key Open-In 213 and Key Closed-In 214 until the "panic" state is reset. In another embodiment, the door controller 110 may be in a "panic" state and configured to ignore inputs received from the lock control interface 130 until the "panic" state is cleared.

A Clear-In 204 may be a wired input coupled to a NO dry contact at a client control device. The client control device may be configured to close the contact when an input is received. Activating the Clear-In 204 disables the Horn-Out 205 under certain specific conditions. For example, the microcontroller 135 may be programmed to disable a moving unlocked door alarm or tamper alarm at the Horn-Out 205 responsive to a Clear input condition.

The Horn-Out 205, Lock LED-Out 206 are wired outputs for external indicators, such as speakers and light emitting diodes (LEDs). In various embodiments, the microcontroller 135 may be programmed to activate these outputs responsive to the state of lock control interface 130. For example, if the lock control interface 130 is in an "unlocked" state, then the microcontroller 135 may activate the Lock-LED-Out 206.

The Key Open-In 213 and Key Closed-In 214 may be wired inputs coupled to a normally closed contact in a key controlled control device. In various embodiments, the contact is opened and closed by key switch that is operated by turning a key in the key control device. Also depicted in FIG. 3 are Jack-In 212 and Jack-Out 215.

Figure 4:
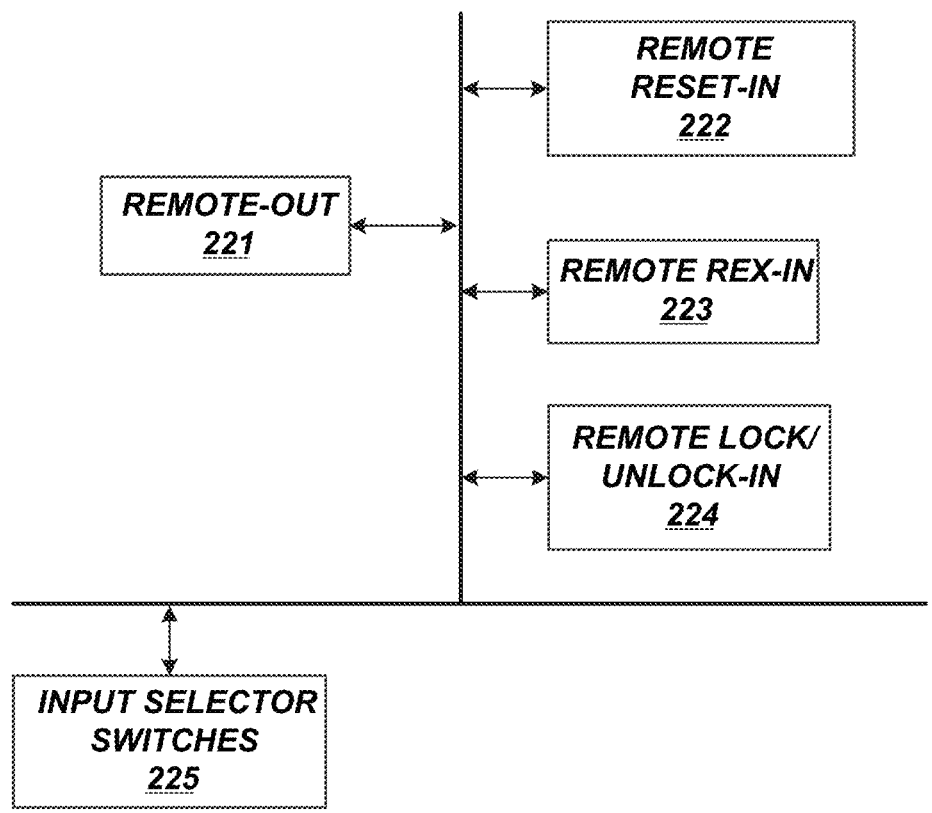
FIG. 4 illustrates a diagram of the inputs and outputs of a remote line interface implementable by an access control system according to an embodiment of the disclosure.

FIG. 4 shows inputs and outputs of remote line interface 120 in an access control system 2, in accordance with an embodiment of the disclosure. The remote line interface 120 includes Remote-Out 221, and three "remote" inputs: Remote Reset-In 222, Remote Request to Exit-In 223 (REX-In 223), and Remote Lock/Unlock-In 224. The Remote Reset-In 222, Remote REX-IN 223, and Remote Lock/Unlock-In 224, may be configured to be coupled to dry contacts when an input is activated at a control device. They also may be configured to receive a monitored voltage. The inputs may be configured to selectably receive the dry contacts or voltage responsive to the position of selector switches 225.

The Remote Reset-In 222 may be a wired input coupled to a contact in a control device. In one embodiment, if the Remote Reset-In 222 is activated then a voltage associated with a reset condition is generated and provided at the Remote-Out 221 and received at the Remote Line-In 209 of the lock control interface 130. The microcontroller 135 may be programmed to determine a reset condition responsive to the received voltage value and a lookup table stored in program memory. Responsive to the reset condition, the microcontroller 135 may be programmed to reset alarm, panic, tamper and trouble conditions to normal operation provided the initiating source for the alarm, panic, tamper or trouble conditions has been removed. The door controller 110 may reset and restore the door to a normal condition responsive to receiving the reset condition from the lock control interface 130.

The Remote REX-In 223 may be a wired input coupled to a contact in a control device. In one embodiment, if the Remote REX-In 223 is activated then a voltage associated with a request to exit condition is generated and provided at the Remote-Out 221 and received at the Remote Line-In 209 of the lock control interface 130. The microcontroller 135 may be programmed to determine a request-to-exit condition responsive to the received voltage value and a lookup table stored in program memory. The Remote Rex-In 223 is always enabled. If the lock control interface 130 is in a lock state then the door controller 110 will open the door responsive to activation of the Remote REX-In 223, stay open while the Remote REX-In is active (in other words until the Remote REX-In is inactive), pause (remain open) for a programmed access delay time, and then close the door. If the lock control interface 130 is in a normal operation state, activating the Remote REX-In 223 will control the door in the same manner as the local REX-In 208.

The Remote Lock/Unlock-In 224 may be a wired input coupled to a contact in a control device. Activating the Remote Lock/Unlock-In 224 operates a door in the same manner as the local Lock/Unlock-In 201. In one embodiment, the remote Lock/Unlock-In 224 may be controlled by receiving (or not receiving) a 12-24 volt signal from the building management system 150. Remote Lock/Unlock-In 224, when using the 12-24 volt signal may be wired in parallel with other RLIs thereby allowing multiple doors to be locked/unlocked simultaneously.

Figure 5:
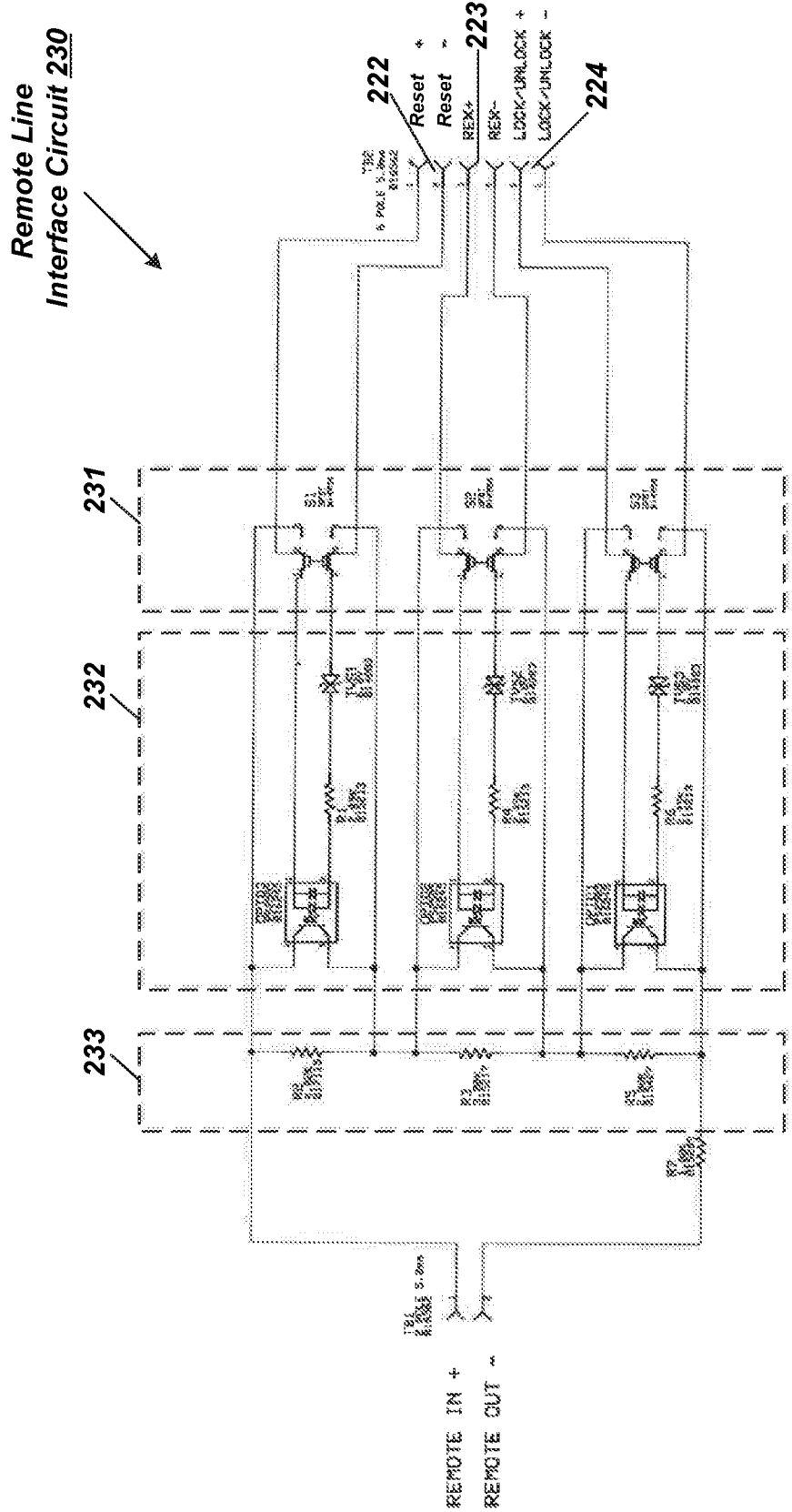
FIG. 5 shows a circuit diagram of a remote line interface implementable by an access control system according to an embodiment of the disclosure.

FIG. 5 shows a remote line interface circuit 230, in accordance with an embodiment of the disclosure. On the right of the circuit are the input terminals for the Remote Reset-IN 222, Remote REX-In 223, and Remote Lock/Unlock-In 224. Each of the remote inputs has a circuit path to the terminals of the Remote-Out 221. The circuit 230 may include a selection circuit 231, isolation circuit 232 and output voltage conditioning circuit 233. The selection circuit 231 may be configured to selectively enable either dry contact inputs or a voltage input at the remote input lines 222, 223, and/or 224. The isolation circuit 232 may be configured to prevent low voltages (such as supervisory signals) from activating the input, and may include, for example, a transient-voltage-suppression diode. The voltage conditioning circuit 233 may be configured to condition the voltages for each of the remote-inputs. After conditioning, a specific voltage value is associated with each specific set of inputs. For example, the Remote Reset-In 222 may be associated with about a 6 to 7 volt range.

Figure 6:
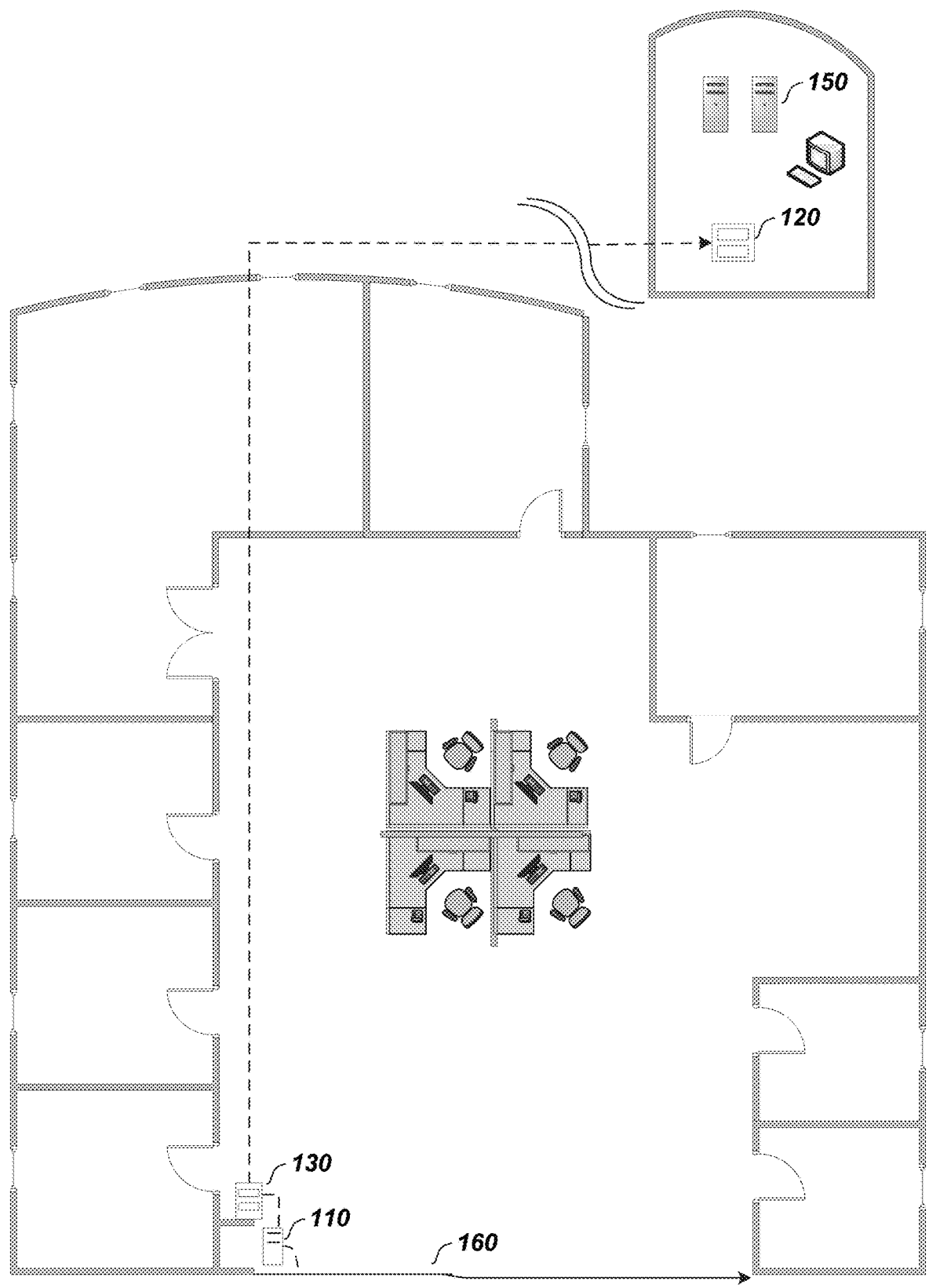
FIG. 6 shows an office suite having an installed movable partition and access control system according to an embodiment of the disclosure.

FIG. 6 shows an embodiment of an access control system 2 installed in a building. The door 160, which is a movable partition, is installed at an entryway to an office suite. When extended, the door 160 provides a security and/or fire barrier to the office suite. When retracted, the way is open and the door 160 is out of site in a pocket in a wall. The lock control interface 130 is installed on a nearby wall with the door controller 110. The lock control interface 130 is coupled to the remote line interface 120, which is installed in a command room at some remote location from the office suite. In the event of a security situation, the door 160 may be controlled from the command center by activating one or more of the inputs of the remote line interface 120.

In one embodiment, the connection between the lock control interface 130 and the door controller 110 may be a digital connection and the connection between the lock control interface 130 and the remote line interface 120 may be an analog connection. The line that connects the lock control interface 130 and the remote line interface 120 may be a monitored line. Further, the control devices that provide the current to the inputs of the remote line interface 120 may selectably monitor those lines for faults.

Figure 7A:
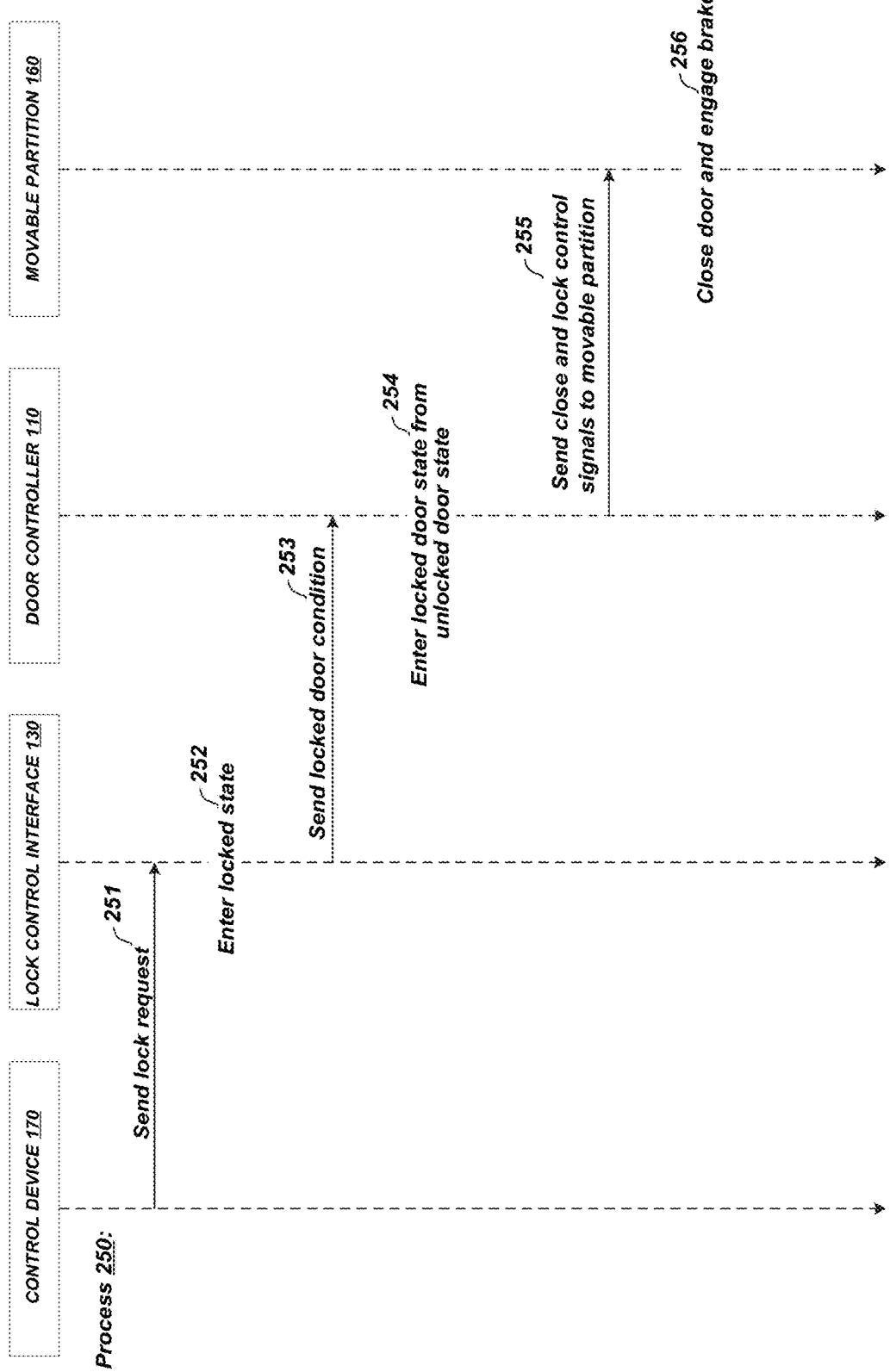
FIG. 7A shows a flow-chart of lock process implemented by an access control system according to an embodiment of the disclosure.

FIG. 7A illustrates a lock process 250, in accordance with an embodiment of the disclosure. In one embodiment, the movable partition 160 may be open, i.e., retracted and ingress/regress unrestricted just prior to the start of process 250. A control device 170 sends a lock request to the lock control interface 130 in operation 251. In various embodiments, the control device 170 may be a key switch, key card device, building management system, or some other authorized device. The lock control interface 130 enters a locked door state responsive to receiving the lock door request at the Lock/Unlock-In 201, in operation 252. The lock control interface 130 sends a locked door condition to the door controller 110, in operation 253. The door controller 110 enters a locked door state responsive to receiving the lock door condition, in operation 254. The door controller 110 sends close and lock control signals to the movable partition 160 in operation 255. The movable partition 160 extends to a closed position and engages a brake responsive to the received close and lock control signals, in operation 256.

Figure 7B:
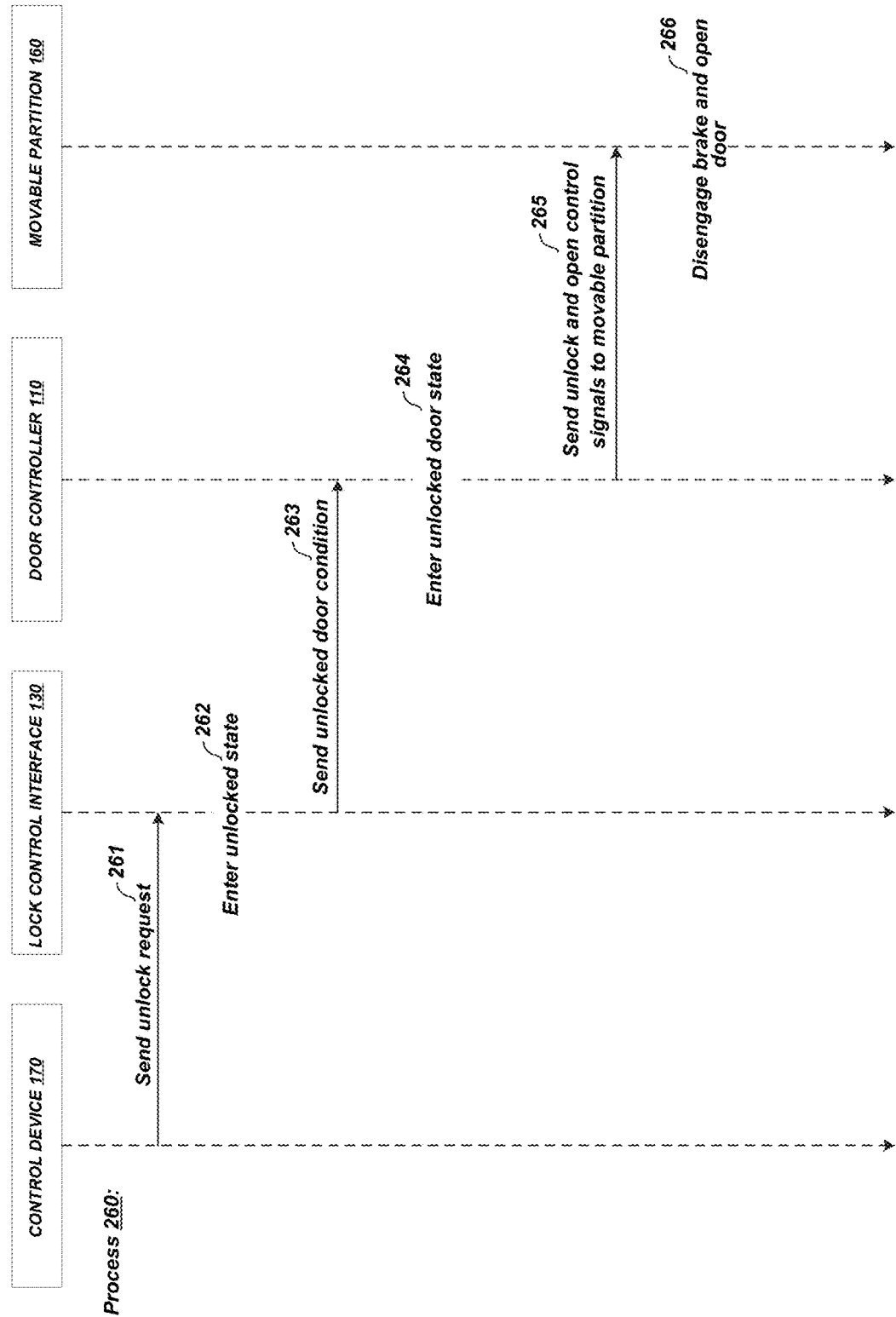
FIG. 7B shows a flow-chart of an unlock process implemented by an access control system according to an embodiment of the disclosure.

FIG. 7B illustrates an unlock process 260, in accordance with an embodiment of the disclosure. In one embodiment, the movable partition 160 may be closed, i.e., extended with brake engaged such that ingress is restricted just prior to the start of process 260. A control device 170 sends an unlock request to the lock control interface 130 in operation 261. In various embodiments, the control device 170 may be a key switch, key card device, building management system, or some other authorized device. The lock control interface 130 enters an unlocked door state responsive to receiving the unlock door request at the Lock/Unlock-In 201, in operation 262. The lock control interface 130 sends an unlocked door condition to the door controller 110, in operation 263. The door controller 110 enters an unlocked door state responsive to receiving the unlock door condition, in operation 264. The door controller 110 sends unlock and open control signals to the movable partition 160 in operation 265. The movable partition 160 disengages the brake and retracts responsive to the received unlock and open control signals, in operation 266.

Figure 8A:
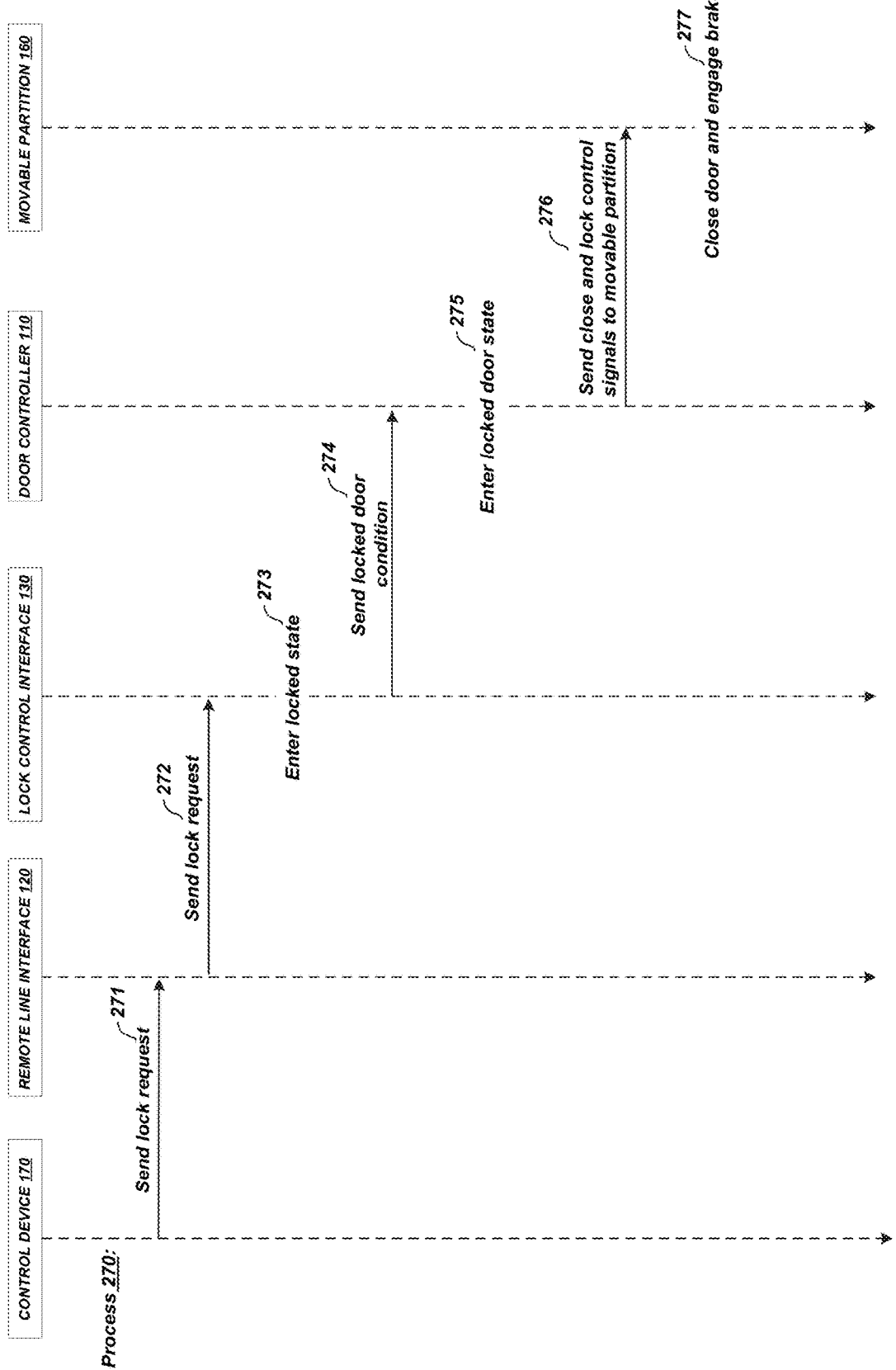
FIG. 8A shows a flow-chart of a lock process implemented by an access control system according to an embodiment of the disclosure.

FIG. 8A illustrates a lock process 270, in accordance with an embodiment of the disclosure. In one embodiment, the movable partition 160 may be open, i.e., retracted and ingress/egress unrestricted just prior to the start of process 270. A control device 170 sends a lock request to the remote line interface 120 in operation 271. In various embodiments, the control device 170 may be a key switch, key card device, building management system, or some other authorized device. The remote line interface 120 may be in a command center or other location that is remote from the movable partition—e.g., up to 10,000 feet. The remote line interface 120 sends the lock request to the lock control interface 130 in operation 272. The lock control interface 130 enters a locked door state responsive to receiving the lock door request at the Remote-Line-IN 209, in operation 273. The lock control interface 130 sends a locked door condition to the door controller 110, in operation 274. The door controller 110 enters a locked door state responsive to receiving the lock door condition, in operation 275. The door controller 110 sends close and lock control signals to the movable partition 160 in operation 276. The movable partition 160 extends to a closed position and engages a brake responsive to the received close and lock control signals, in operation 277.

Figure 8B:
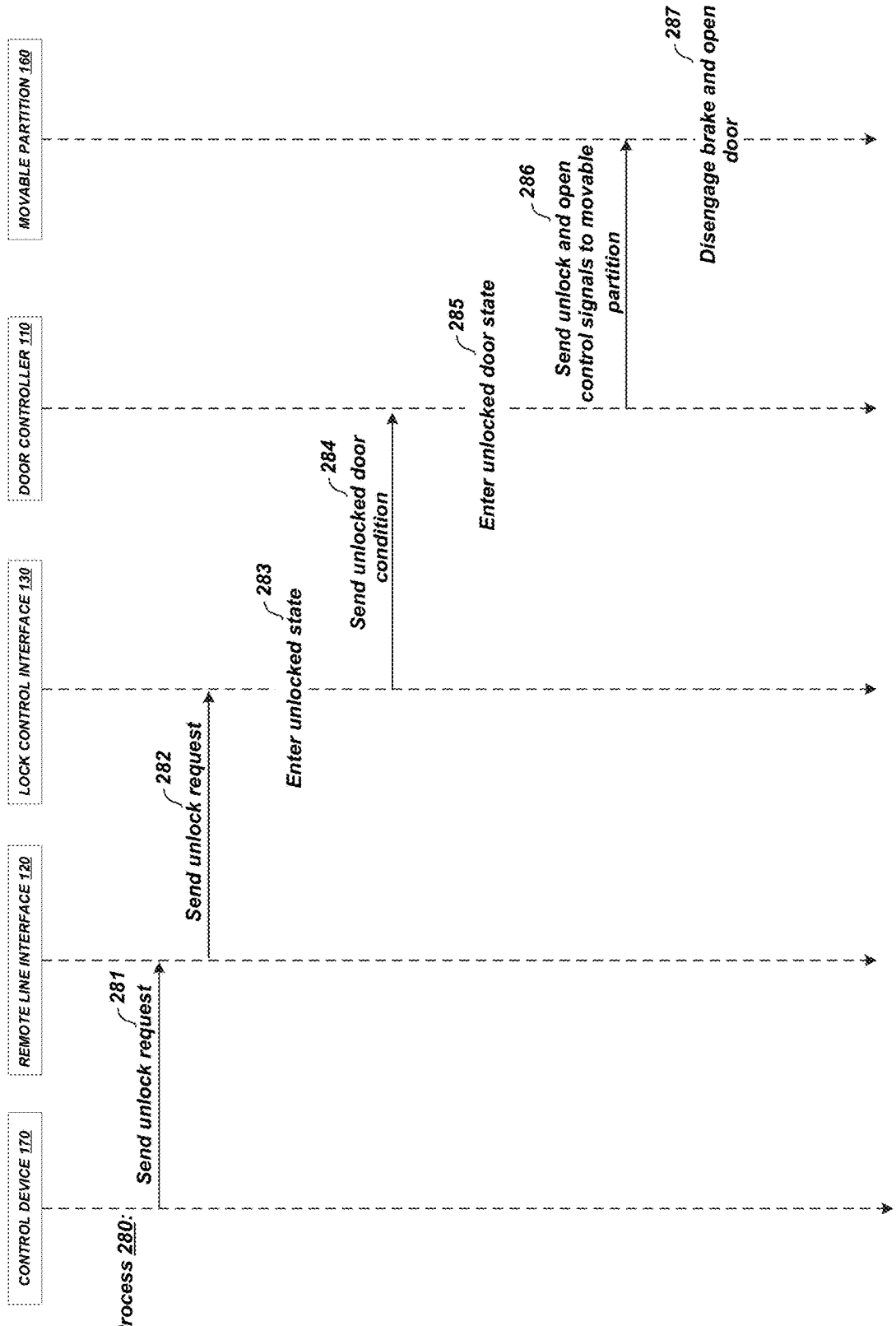
FIG. 8B shows a flow-chart of an unlock process implemented by an access control system according to an embodiment of the disclosure.

FIG. 8B illustrates an unlock process 280, in accordance with an embodiment of the disclosure. In one embodiment, the movable partition 160 may be closed, i.e., extended with brake engaged such that ingress/egress is restricted just prior to the start of process 280. A control device 170 sends an unlock request to the remote line interface 120 in operation 281. In various embodiments, the control device 170 may be a key switch, key card device, building management system, or some other authorized device. The remote line interface 120 may be in a command center or other location that is remote from the movable partition—e.g., up to 10,000 feet. The remote line interface 120 sends the unlock request to the lock control interface 130 in operation 282. The lock control interface 130 enters an unlocked door state responsive to receiving the unlock door request at Remote-Line-IN 209, in operation 283. The lock control interface 130 sends an unlocked door condition to the door controller 110, in operation 284. The door controller 110 enters an unlocked door state responsive to receiving the unlock door condition, in operation 285. The door controller 110 sends unlock and open control signals to the movable partition 160 in operation 286. The movable partition 160 disengages the brake and retracts to an open position responsive to the received unlock and open control signals, in operation 287.

Figure 9:
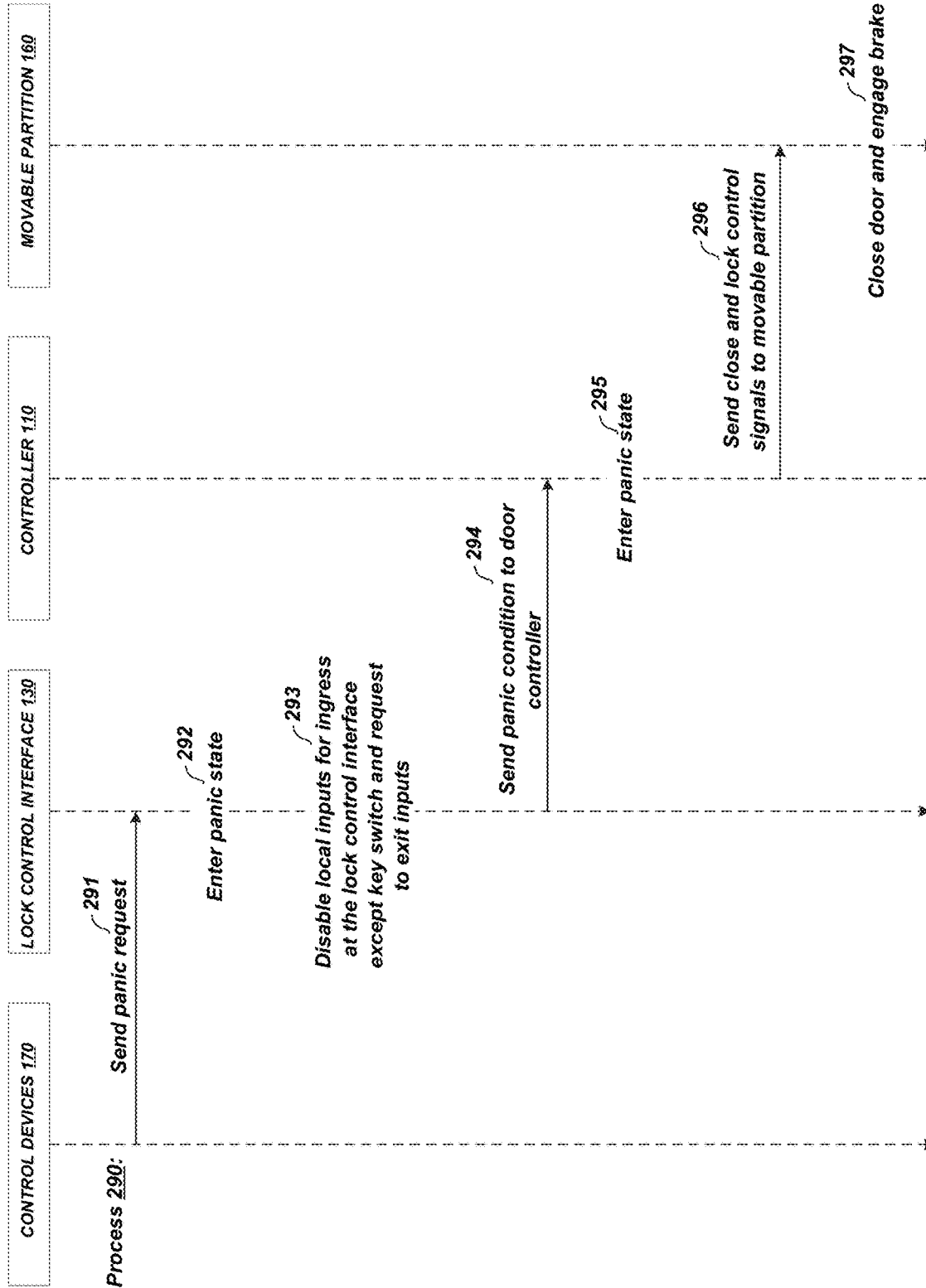
FIG. 9 shows a flow-chart of a panic process implemented by an access control system according to an embodiment of the disclosure.

FIG. 9 illustrates a panic process 290, in accordance with an embodiment of the present disclosure. A control device 170 sends a panic request to the lock control interface 130 in operation 291. The received panic request activates the Panic-In 203 of the lock control interface 130, and the lock control interface 130 enters a panic state responsive to activated Panic-In 203, in operation 292. The lock control interface 130 disables local inputs for ingress at the lock control interface 130, except for the key switch inputs 213 and 214 and the local REX-In input 208, in operation 293. In one embodiment, the movable partition 160 will respond to operating the key switch inputs 213 and 214 and/or the local REX-In input 208 while the lock control interface 130 is in a panic state. The lock control interface 130 sends a panic condition to the door controller 110, in operation 294. The door controller 110 enters a panic state in operation 295. The door controller 110 sends close and lock control signals to the movable partition 160, in operation 296. The movable partition 160 extends to a closed position and engages the brake in operation 297.

In various embodiments, the microcontroller 135 may be programmed to accept reset signals to reset the lock control interface 130 to a normal operating state from a panic state. By way of non-limiting example, activation of the of the remote Reset-In 222 and then a received reset condition at the Remote Line-In 209 of the lock control interface 130, holding a key switch in the closed direction for a predetermined number of seconds, receiving a reset signal from a reset circuit, receiving a reset signal from a building management system, and directly resetting a flag or bit in software.

In various embodiments, a door may be programmed to have a first or normal operating state. For example, a normally open (unlocked) or normally closed (locked) door. In various embodiments, by asserting inputs on the lock control interface 130 and remote line interface 120, other operating states are enabled, for example, a locked door may transition to an unlocked door or vice versa. A door may also transition "back" to its normal operating state.

Figure 10:
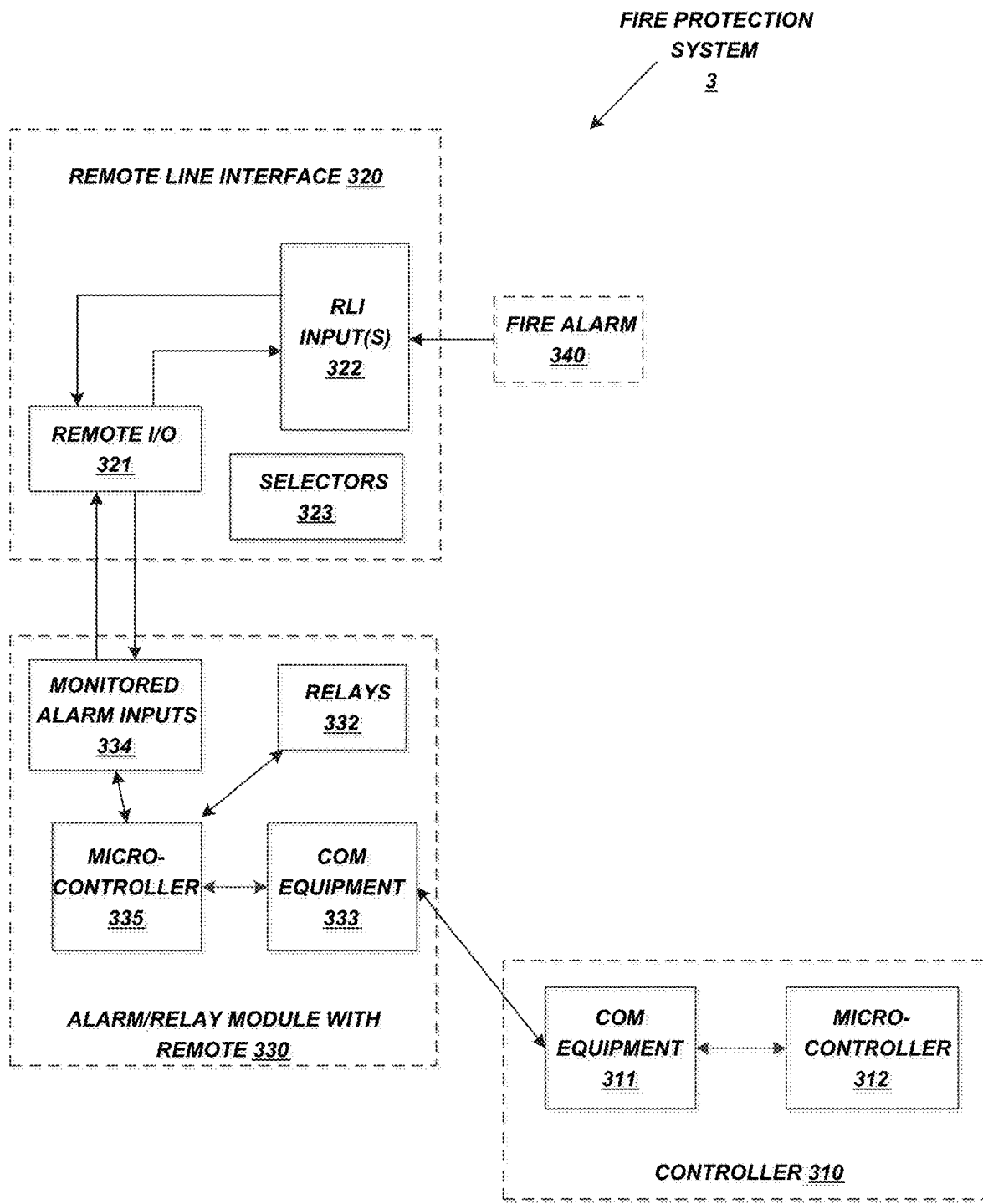
FIG. 10 shows a block diagram of a fire protection system that includes a remote line interface and may be implemented to control a movable partition according to an embodiment of the disclosure.

FIG. 10 illustrates another embodiment of a control system, in particular, a fire hazard protection system 3. The fire hazard protection system 3 includes a door controller 310, an alarm/relay module with remote (ARMR) 330, and a remote line interface 320. The ARMR 330 may include, relays 332, COM equipment 333, monitored alarm inputs 334, and microcontroller 335.

The remote line interface 320 may include remote I/O 321, selectors 323, and RLI inputs 322. The remote I/O inputs may be coupled to the monitored alarm inputs 334 of the ARMR 330. The RLI inputs 322 may be wired inputs consisting of normally open contacts that are coupled to a fire alarm system and the like.

In one embodiment, the RLI alarm inputs 322 of multiple remote line interfaces 320 may be arranged and wired in parallel such that they receive a fire alarm signal as a group. In such an embodiment, multiple movable partitions operating as fire protection doors may be controlled as a group from a central command location. For example, a group of doors may be closed as a group and then opened individually using the door specific fireman override to permit firefighters to enter designated parts of a building without requiring the firefighters to operate a given door, which could expose them to extreme danger.

Figure 11:
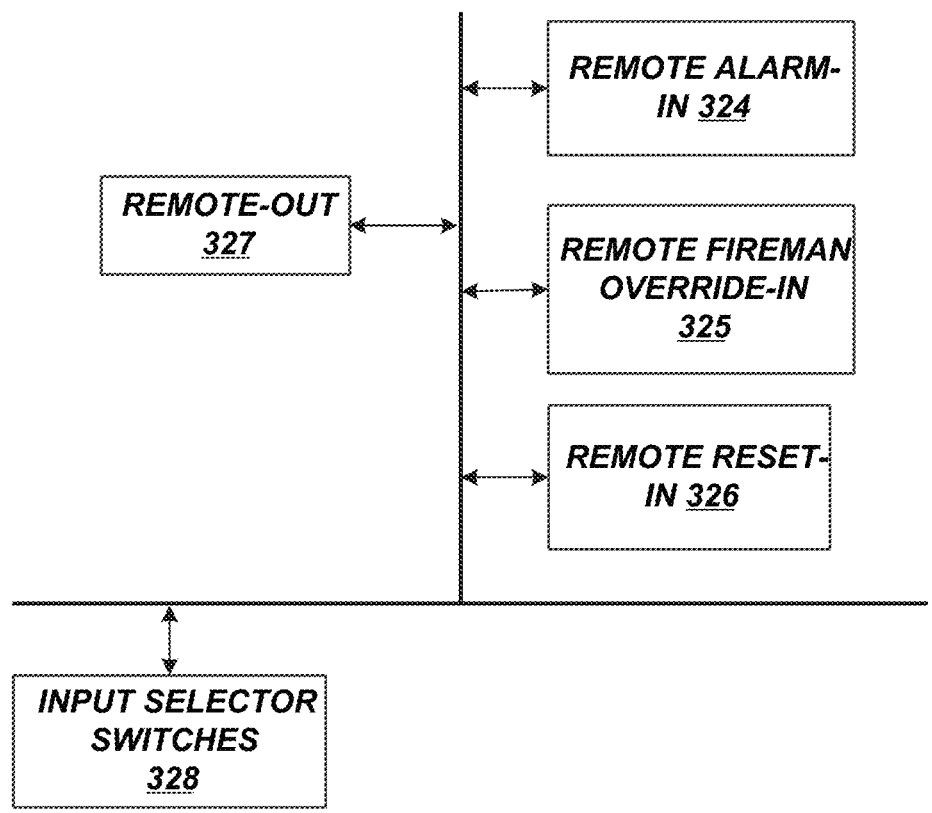
FIG. 11 illustrates a diagram of the inputs and outputs of a remote line interface implementable by a fire protection system according to an embodiment of the disclosure.

FIG. 11 illustrates inputs and outputs in a remote line interface 320 in a fire hazard protection system 3, according to an embodiment of the disclosure. The remote line interface 320 includes Remote-Out 327, and three "remote" inputs: Remote Alarm-In 324, Remote Fireman Override-In 325 and Remote Reset-In 326. Each of the three remote inputs may be configured to be coupled to dry contacts when an input is activated at a control device. They also may be configured to receive a monitored voltage. The inputs may be configured to selectably receive the dry contacts or voltage responsive to the position of selector switches 328.

Referring to FIGS. 10 and 11, the Remote Alarm-In 324 may be a wired input coupled to a contact in a fire alarm, smoke detector, or building management system 150 (see FIG. 1). In one embodiment, if the Alarm-In 324 is asserted/activated then a voltage associated with an alarm condition is generated and provided at the Remote-Out 327 and received at the monitored alarm inputs 334 of the ARMR 330. The microcontroller 335 may be programmed to determine an alarm condition responsive to the received voltage value and a lookup table stored in memory. Responsive to the alarm condition, the microcontroller 335 may be programmed to communicate the condition to the door controller 110, which then enters a fire mode responsive to the received alarm condition and closes the door to protect against the spread of fire.

The Remote Fireman Override-In 325 may be a wired input coupled to a contact in a control device. If the Remote Fireman Override-In 325 is activated, then a voltage associated with a fireman override request condition is generated and provided at the Remote Alarm-Out 327 and received at the monitored alarm inputs 324 of the ARMR 330. The microcontroller 335 may be programmed to determine a fireman override condition responsive to the received voltage value and a lookup table stored in memory. Responsive to the fireman override condition, the microcontroller 335 may be programmed to communicate the condition to the door controller 110, which then opens the door to a predetermined position and holds it there until the override is de-activated (e.g., because a control device is no longer being asserted), after which the door re-closes. In this way, an individual door can be opened from a command center, for example, after it has been determined by the chief that it is safe to send his men into that area to fight the fire. If the door is opened in an unsafe condition and results in a flash over explosion it may kill a fire crew sent to fight the fire. Hence, control may be given to the remote command center to gather facts and understand where it is safe and not safe to send a fire crew.

The Remote Reset-In 326 may be a wired input coupled to a contact in a control device. If the Remote Reset-In 326 is activated, then a voltage associated with a reset condition is generated and provide at the Remote-Out 327 and received at the monitored alarm inputs 334 of the ARMR 330. The microcontroller 335 may be programmed to determine a reset condition responsive to the received voltage value and a lookup table stored memory. Responsive to the reset condition, the microcontroller 335 may end any trouble conditions/modes and return to a normal operation mode, and communicate the reset condition to the door controller 110. The door controller 110 may also end any trouble modes and enter normal operation responsive to the received reset condition.

Figure 12:
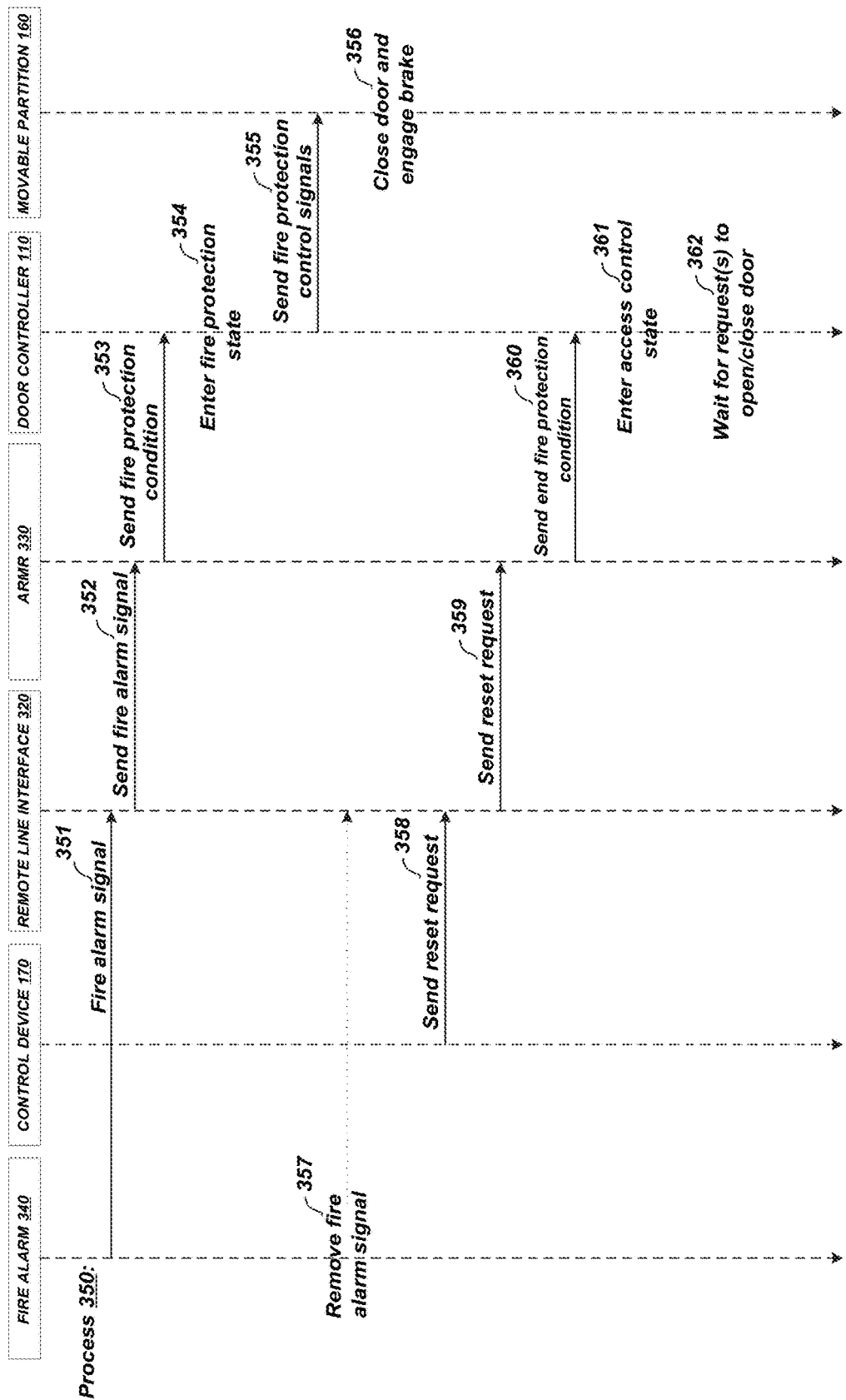
FIG. 12 shows a flow-chart of a fire protection process implemented by a fire protection system according to an embodiment of the disclosure.

FIG. 12 illustrates a fire protection process 350, in accordance with an embodiment of the disclosure. A fire alarm 340 sends a fire alarm signal to the alarm remote line interface 320 in operation 351. The remote line interface 320 sends an alarm to the ARMR 330 in operation 352. The ARMR 330 sends a fire protection condition to the door controller 110 in operation 353 responsive to the activated monitored alarm input 334, and optionally, a lookup table. The door controller 110 enters a fire protection state responsive to the received fire protection condition in operation 354. The door controller 110 sends fire protection control signals to the movable partition 160 in operation 355. The movable partition 160 closes the door and, optionally, engages the brake responsive to the received fire protection control signals in operation 356.

The fire alarm 340 stops asserting the fire alarm signal in operation 357. After fire alarm 340 removes a fire alarm signal to the alarm remote line interface 320, the control device 170 sends a reset request to the remote line interface 320, in operation 358. The remote line interface 320 sends the reset request to the alarm/relay interface 330 in operation 359. The alarm/relay interface 330 sends the end fire protection condition to the door controller 110 responsive to the received reset request, in operation 360. The door controller 110 enters an access control state responsive to the received end of fire protection condition, in operation 361. The door controller 110 awaits requests to open/close the door in operation 362.

In various embodiments described herein, the movable partition 160 may operate at standard speed and high speed. By way of non-limiting examples, embodiments of the disclosure operating at standard speed may operate according to speed ranges of 6 to 12 inches per second, inclusive. By way of non-limiting examples, embodiments of the disclosure operating at high speed may operate according to speed ranges of 12 to 24 inches per second, inclusive. Movable partitions operating at standard speed and high speed include foldable movable partitions of the types described herein.

While the access control system 2 was described as including a lock control interface 130, remote line interface 120, and door controller 110, one of ordinary skill in the art would understand that additional elements may be added, act on, or acted on, and still be consistent with the present invention. Indeed, it is specifically contemplated that in some embodiments the remote line interface 120 may be replaced by a line resistor and supervision will occur at the lock control interface instead of an access control device supplying current to the remote line interface 120.

While the inputs 131 have been described as analog inputs in connection with the various embodiments described herein, one of ordinary skill in the art will recognize that inputs configured to receive a modulated signal may be used and be consistent with the present invention. Such inputs, by way of non-limiting example, may be configured to interface with Ethernet, telephone line, broadband over power line (BPL), MODBUS or the like.

Although each exemplary operation illustrated in the drawings accompanying the disclosure recite steps performed in a particular order, the present invention does not necessarily need to operate in that recited order. One of ordinary skill in the art would recognize many variations, including performing steps in a different order.

Further, while certain embodiments have been described and shown in the accompanying drawings, such embodiments are merely illustrative and not restrictive of the scope of the invention, and this invention is not limited to the specific constructions and arrangements shown and described, since various other additions and modifications to, and deletions from, the described embodiments will be apparent to one of ordinary skill in the art. Indeed, the features of the various embodiments described herein are not mutually exclusive and can exist in various combinations and permutations, even if such combinations or permutations have not been expressly described. Thus, the scope of the invention is only limited by the literal language, and legal equivalents, of the claims that follow.

We claim:

1. An access control system operably coupled to a movable partition having a motor and brake system that is operable to extend and retract the movable partition responsive to one or more control signals received from motor control circuitry, the access control system comprising:
   a remote interface comprising:
      at least one remote input configured to be activated by an access device; and
      at least one output, wherein the remote interface is configured to activate the at least one output responsive to the activated at least one remote input;
   a lock control interface comprising inputs including at least one monitored input configured to be coupled to the at least one output of the remote interface and an access control device input, the lock control interface configured to:
      monitor for fault conditions present at an electrical connection between the monitored input and the at least one output of the remote interface;
      determine an input condition responsive to a voltage value received via the electrical connection;
      disable the access control device responsive to the determined input condition being a lock condition, or enable the access control device input responsive to the determined input condition being an unlock condition; and
      communicate an instruction to a door controller responsive to the determined input condition, the communicated instruction indicative of a closed and locked door responsive to the determined input condition being the lock condition, and the communicated instruction indicative of an unlocked door responsive to the determined input condition being the unlock condition;
   wherein the door controller is configured to provide one or more control signals to the motor control circuitry responsive to the communicated instruction,
   wherein the one or more control signals provided responsive to the communicated instruction being indicative of a closed and locked door comprise control signals configured to:
      cause the movable partition to extend to a closed position and resist retraction responsive to the movable partition being open; or
      cause the movable partition to resist retraction responsive to the movable partition being closed,
   wherein the one or more control signals provided responsive to communicated instructions indicative of an unlocked door comprise control signals configured to:
      cause the movable partition to permit retraction; or
      cause the movable partition to permit retraction and retract to an open position.

2. The system of claim 1, wherein the at least one remote input of the remote interface comprises a first electrical input configured to receive a dry contact and a second electrical input configured to receive a voltage potential.

3. The system of claim 2, wherein the remote interface further comprises a selector switch that is configured to selectably enable one of the first electrical input and the second electrical input.

4. The system of claim 2, wherein the second electrical input is configured to be monitored for electrical faults by a device providing a current to the second electrical input.

5. The system of claim 4, the lock control interface is further configured to compare the voltage value received at the at least one monitored input to a look-up table.

6. The system of claim 1, wherein lock control interface is further configured to:
   receive a second voltage value at the at least one monitored input; and
   determine if the second voltage value is associated with a fault condition.

7. The system of claim 6, wherein the lock control interface is configured to determine that the second voltage value is associated with a fault condition responsive to comparing the second voltage value to one or more fault condition voltage values.

8. The system of claim 1, wherein the lock control interface comprises a selector switch configured to enable the at least one monitored input to be activated by one of an open or a closed contact coupled to the at least one remote input.

9. A system, comprising:
   a movable partition having a motor and brake system that is operable to extend and retract the movable partition responsive to one or more control signals received from a motor control circuitry;
   an interface comprising inputs including a monitored circuit between a first activatable input, a second activatable input, and an access control device input, wherein the interface is configured to:
      monitor for fault conditions present at an electrical communication provided by the monitored circuit;
      determine an input condition responsive to a voltage value received via the electrical communication;
      disable or enable one or more other activatable inputs responsive to activation of the first activatable input, the activation communicated via the monitored circuit;
      disable the access control device responsive to the determined input condition being a lock condition, or enable the access control device input responsive to the determined input condition being an unlock condition;

a door controller communicatively coupled to the interface and operatively coupled to the motor control circuitry, wherein the door controller is configured to:

receive an instruction responsive to the input condition, the instruction indicative of a closed and locked door responsive to the input condition being the lock condition, and the instruction indicative of an unlocked door responsive to the determined input condition being the unlock condition; associated with the first activatable input from the interface system;

provide one or more control signals to the motor control circuitry responsive to the instruction;

wherein the one or more control signals provided responsive to the instruction being indicative of a closed and locked door comprise control signals configured to:

cause the movable partition to extend to a closed position and resist retraction responsive to the movable partition being open; or cause the movable partition to resist retraction responsive to the movable partition being closed, wherein the one or more control signals provided responsive to the instruction indicative of an unlocked door comprise control signals configured to:

cause the movable partition to permit retraction; or cause the movable partition to permit retraction and retract to an open position.

10. The system of claim 9, wherein the monitored circuit is between the one or more other activatable inputs that the interface is configured to enable or disable and the second activatable input of the interface.

11. The system of claim 9, wherein the one or more other activatable inputs that the interface is configured to enable or disable and the second activatable input are arranged on an opposite side of the monitored circuit from the first activatable input.

12. The system of claim 11, wherein the interface is configured to disable all the one or more activatable inputs associated with ingress or egress responsive to activation of the first activatable input.

13. The system of claim 12, wherein the interface is configured to identify activation of the first activatable input responsive to activation of the second activatable input.

14. A method of operating a movable partition having a motor and brake system that is operable to extend and retract the movable partition, the method comprising:

defining a first operation of the movable partition;

monitoring for fault conditions present at an electrical connection between a monitored input and a remote input;

receiving, via the electrical connection between the monitored input and the remote input, an indication of an input condition via the remote input, the input condition indicative of modifying operation of the movable partition;

disabling an access control device responsive to the input condition being a lock condition, or enable the access control device responsive to the input condition being an unlock condition;

providing one or more control signals to motor control circuitry of the movable partition;

causing the movable partition to extend to a closed position and resist retraction responsive to the movable partition being open or causing the movable partition to resist retraction responsive to the movable partition being closed responsive to the input condition being indicative of a closed and locked door; and causing the movable partition to permit retraction or causing the movable partition to permit retraction and retract to an open position responsive to the input condition being indicative of an unlocked door.

15. The method of claim 14, further comprising:

defining a locked mode for control of the movable partition and enabling the locked mode responsive to the indication of the lock mode being asserted; and while in the locked mode:

generating one or more control signals configured to cause the movable partition to deploy and a brake to engage responsive to the locked mode being enabled; and preventing the normal response to all ingress indicators except indicators indicative of authorized ingress requests and ingress requests asserted at a remote interface.

16. The method of claim 15, further comprising generating second control signals configured to cause the brake to disengage and the movable partition to retract responsive to the lock mode not being asserted.

17. The method of claim 14, further comprising:

defining a panic mode for control of the movable partition and enabling the panic mode responsive to the indication of the lock mode being asserted;

while in the panic mode:

generating one or more control signals configured to cause the movable partition to deploy and a brake to engage responsive to the lock mode being asserted; and preventing the normal response to all ingress and egress indicators except indicators indicative of ingress and egress requests asserted at the remote interface.

18. The method of claim 17, further comprising, generating one or more second control signals configured to cause the brake to disengage and the movable partition to retract responsive to the lock mode not being asserted and a reset being asserted.

19. The method of claim 14, further comprising disabling at least one of an input associated with the ingress indicator or an input associated with the egress indicator.

20. A method of operating a movable partition having a motor and brake system that is operable to extend and retract the movable partition, the method comprising:

defining a first operation of the movable partition;

monitoring for fault conditions present at an electrical connection between a monitored input and a remote input;

receiving, via the electrical connection between the monitored input and the remote input, an indication of a protection mode being asserted at the first input of a remote interface, the protection mode indicative of modifying operation of the movable partition;

determining at least one input condition responsive to the received indication of the protection mode;

disabling an access control device responsive to the input condition being a lock condition, or enable the access control device responsive to the input condition being an unlock condition; and providing one or more control signals to motor control circuitry of the movable partition;

causing the movable partition to extend to a closed position and resist retraction responsive to the movable partition being open or causing the movable partition to resist retraction responsive to the movable partition being closed responsive to the input condition being indicative of a closed and locked door; and causing the movable partition to permit retraction or causing the movable partition to permit retraction and retract to an open position responsive to the input condition being indicative of an unlocked door.

21. The method of claim 20, further comprising:

defining a fire protection mode for control of the movable partition and enabling the fire protection mode responsive to the indication of a protection mode being asserted; and while in the fire protection mode:

generating one or more control signals configured to cause the movable partition to deploy responsive to the fire protection mode being enabled;

preventing the normal response to at least some ingress indicators except indicators indicative of authorized ingress requests and ingress requests asserted at the remote interface; and allowing the normal response to all egress indicators.

22. The method of claim 21, further comprising, disabling the fire protection mode and enabling the first operation of the movable partition responsive to the protection mode not being asserted and an indication of a reset being asserted at a second input of the remote interface.

23. The method of claim 21, further comprising, generating one or more second control signals configured to cause the movable partition to retract while the fire protection mode is enabled responsive to an indication of an override being asserted at a second input of the remote interface.

* * * * *